(12) United States Patent
Matsunaga

(10) Patent No.: US 8,758,915 B2
(45) Date of Patent: Jun. 24, 2014

(54) MODULE UNIT

(75) Inventor: Kazuyuki Matsunaga, Shimada (JP)

(73) Assignee: Yazaki Corporation, Tokyo (JP)

( * ) Notice: Subject to any disclaimer, the term of this patent is extended or adjusted under 35 U.S.C. 154(b) by 291 days.

(21) Appl. No.: 12/811,534

(22) PCT Filed: Jan. 23, 2009

(86) PCT No.: PCT/JP2009/051514
§ 371 (c)(1),
(2), (4) Date: Jul. 2, 2010

(87) PCT Pub. No.: WO2009/093758
PCT Pub. Date: Jul. 30, 2009

(65) Prior Publication Data
US 2010/0285340 A1   Nov. 11, 2010

(30) Foreign Application Priority Data

Jan. 25, 2008   (JP) .................................. 2008-014898

(51) Int. Cl.
*H01M 10/48*   (2006.01)

(52) U.S. Cl.
USPC .......................................... 429/90; 429/175

(58) Field of Classification Search
USPC ......................................................... 429/90
See application file for complete search history.

(56) References Cited

U.S. PATENT DOCUMENTS

| 4,572,878 A | 2/1986 | Daugherty |
| 6,566,005 B1 * | 5/2003 | Shimma et al. ............... 429/148 |
| 6,610,439 B1 * | 8/2003 | Kimoto et al. .................. 429/90 |
| 7,077,704 B2 | 7/2006 | Ikeda et al. |
| 2002/0022178 A1 | 2/2002 | Asaka et al. |
| 2002/0076604 A1 * | 6/2002 | Matsuoka et al. .............. 429/53 |

(Continued)

FOREIGN PATENT DOCUMENTS

| DE | 10-2005-003293 A1 | 7/2006 |
| JP | 10-302847 A | 11/1998 |

(Continued)

OTHER PUBLICATIONS

International Search Report [PCT/ISA/210] dated Jun. 4, 2009, for PCT/JP2009/051514.

(Continued)

*Primary Examiner* — Ula C Ruddock
*Assistant Examiner* — Lisa S Park Gehrke
(74) *Attorney, Agent, or Firm* — Sughrue Mion, PLLC

(57) ABSTRACT

A module unit includes a main body attached to a plurality of battery cells, a bus bar provided on the main body to electrically connect the battery cells, and a temperature sensor retained to the main body to measure a temperature of at least one of the battery cells. The main body has a through hole. The temperature sensor includes a retaining portion which is retained to an edge part of the through hole from a first side of the main body facing to the battery cells after the retaining portion passes through the through hole from a second side of the main body opposite to the first side with respect to the main body, and an attaching portion which has an operation part at an end part thereof and is formed so as not to pass through the through hole. When the main body is attached to the battery cells, the temperature sensor comes into contact with the at least one battery cell.

5 Claims, 5 Drawing Sheets

(56) References Cited

U.S. PATENT DOCUMENTS

| | | |
|---|---|---|
| 2004/0261552 A1 | 12/2004 | Grundmann et al. |
| 2005/0155442 A1* | 7/2005 | Grundmann ................. 73/866.5 |
| 2006/0103346 A1 | 5/2006 | Misu et al. |
| 2006/0262482 A1 | 11/2006 | Yamamoto et al. |

FOREIGN PATENT DOCUMENTS

| | | |
|---|---|---|
| JP | 2002-8627 A | 1/2002 |
| JP | 2004-95381 A | 3/2004 |
| JP | 2005-513468 A | 5/2005 |
| JP | 2005-189080 A | 7/2005 |
| JP | 2006-073362 A | 3/2006 |
| JP | 2006-140054 A | 6/2006 |
| JP | 2006-324060 A | 11/2006 |

OTHER PUBLICATIONS

Office Action dated May 14, 2013 issued by the European Patent Office in corresponding Japanese Patent Application No. 2008-014898.

* cited by examiner

MODULE UNIT

TECHNICAL FIELD

The present invention relates to a module unit of a temperature sensor for measuring the temperature of a battery cell.

BACKGROUND ART

A battery mounted on, for instance, a hybrid motor vehicle or an electric vehicle includes a plurality of battery cells. These battery cells are electrically connected in series by a bus bar to raise an output voltage of, for instance a battery. Then, in order to prevent the overcharge or over-discharge of the battery cells, a temperature sensor for measuring the temperature of the battery cell is attached to the battery.

As a usual temperature sensor attaching structure, for instance, an attaching structure has been known in which a temperature sensor is thermally connected to a battery cell by using a thermally connecting member (see patent literature 1).

Further, an attaching structure has been also known in which a temperature sensor is attached to an upper cover of a battery case for accommodating a plurality of battery cells (see patent literature 2). As shown in FIG. 5, in an upper cover 101 of a battery case, a cylindrical accommodating part 103 for accommodating a temperature sensor 102 is provided and a fastener 104 is provided in the periphery of an opening of the accommodating part 103. Further, in the temperature sensor 102, a clamp 105 engaging with the fastener 104 is provided. The temperature sensor 102 is inserted into the accommodating part 103, and then, the clamp 105 is engaged with the fastener 104 to hold the temperature sensor 102 by the upper cover 101. A bottom of the accommodating part 103 is allowed to come into contact with or close to a battery cell 106 so that the temperature sensor 102 measures the temperature of the bottom of the accommodating part 103.

Further, an attaching structure has been also known in which a battery is provided with a bas bar for electrically mutually connecting a plurality battery cells and a PTC thermistor is attached to a module unit for holding the bas bar (see patent literature 3). In this attaching structure, the PTC thermistor is used not as a temperature measuring element for measuring the temperature of the battery cell, but as an overcurrent limiting element or a circuit protecting element. Therefore, the PTC thermistor does not come into contact with the battery cell and is soldered to a terminal on a connecting circuit.
[patent literature 1] JP-A-2006-73362
[patent literature 2] JP-A-2005-189080
[patent literature 3] JP-A-2004-95381

DISCLOSURE OF INVENTION

Technical Problem

In the temperature sensor attaching structure disclosed in the patent literature 1, the temperature sensor is attached to the battery cells respectively by using the thermally connecting member. Accordingly, when a plurality of temperature sensors are attached to the battery cells, much time and labor are necessary for an attaching work. Further, there is a fear that unevenness in measuring accuracy may possibly arise in the temperature sensors respectively due to the connected states between the thermally connecting member and the battery cells or the temperature sensors.

In the temperature sensor attaching structure disclosed in the patent literature 2, the fastener needs to be formed on the upper cover of the battery case, so that a cost is increased. Further, since the retaining portion of the fastener and the clamp is exposed to an external part, an external force is liable to act on the retaining portion. Therefore, there is a fear that the temperature sensor may be possibly detached from the battery case. Further, since the battery case is kept watertight, the temperature sensor cannot be allowed to pass through the bottom of the accommodating part of the upper cover and come into direct contact with the battery cell. Accordingly, there is a fear that the measuring accuracy of the temperature sensor may be possibly deteriorated.

In the temperature attaching structure disclosed in the patent literature 3, the PTC thermistor is soldered to the terminal on the connecting circuit. Therefore, when a plurality of PTC thermistors are attached to the connecting circuit, much time and labor are required for an attaching work.

The present invention is devised by considering the above-described circumstances and it is an object of the present invention to provide a module unit of a temperature sensor that can easily and assuredly attach a temperature sensor for measuring the temperature of a battery cell and can reduce a cost in addition thereto.

Technical Solution

The above-described object is achieved by a module unit of below-described (1) to (3).
(1) There is provided a module unit, comprising:
  a main body attached to a plurality of battery cells;
  a bus bar provided on the main body to electrically connect the battery cells; and
  a temperature sensor engaged with the main body to measure a temperature of at least one of the battery cells,
    wherein the main body has a through hole;
    wherein the temperature sensor includes:
    a retaining portion which is retained to an edge part of the through hole from a first side of the main body facing to the battery cells after the retaining portion passes through the through hole from a second side of the main body opposite to the first side with respect to the main body; and
    an attaching portion which has an operation part at an end part thereof and is formed so as not to pass through the through hole; and
    wherein when the main body is attached to the battery cells, the temperature sensor comes into contact with the at least one battery cell.
(2) Preferably, when the main body is attached to the battery cells, the temperature sensor is pressed toward the main body by the at least one battery cell, so that the retaining portion arranged at the first side of the main body is retained to the edge part of the through hole.
(3) Preferably, the retaining portion is elastically deformed. Here, it is preferable that, the retaining portion is elastically deformed in a direction in which the main body is attached to the battery cells.

Advantageous Effects

According to the present invention, the operation part of the attaching portion provided in the temperature sensor is held and pushed downward so that the temperature sensor is pressed into the through hole formed in the main body of the module unit to engage the temperature sensor with the through hole. Then, under this state, the main body is attached to the plurality of battery cells, so that the temperature sensor is allowed to come into contact with the prescribed battery cell. Thus, even when a plurality of temperature sensors are attached, only a pushing-in operation may be carried out. Accordingly, an attaching work can be more simplified than a case that the temperature sensors are individually attached by using a thermally connecting member or a solder and work efficiency can be improved. Further, a fastener usually provided in an accommodating part of a battery case is not required so that a cost can be reduced.

Then, a retaining portion of the main body and the temperature sensor is accommodated between the battery cell and the main body. Thus, an external force can be prevented from acting on the retaining portion and the temperature sensor can be prevented from being unexpectedly detached from the main body.

Then, the temperature sensor is sandwiched between the main body and the battery cell. Thus, the temperature sensor can be assuredly and directly allowed to come into contact with the battery cell and the deterioration of a measuring accuracy of the temperature sensor can be avoided.

Further, an error at the time of attaching the main body to the battery cells is absorbed by an elastic deformation of the retaining portion. Then, an elastic restoring force of the retaining portion acts on the temperature sensor so as to press the temperature sensor to the battery cell. Thus, the temperature sensor can be more assuredly allowed to come into contact with the battery cell.

BEST MODE FOR CARRYING OUT THE INVENTION

Figure 1:
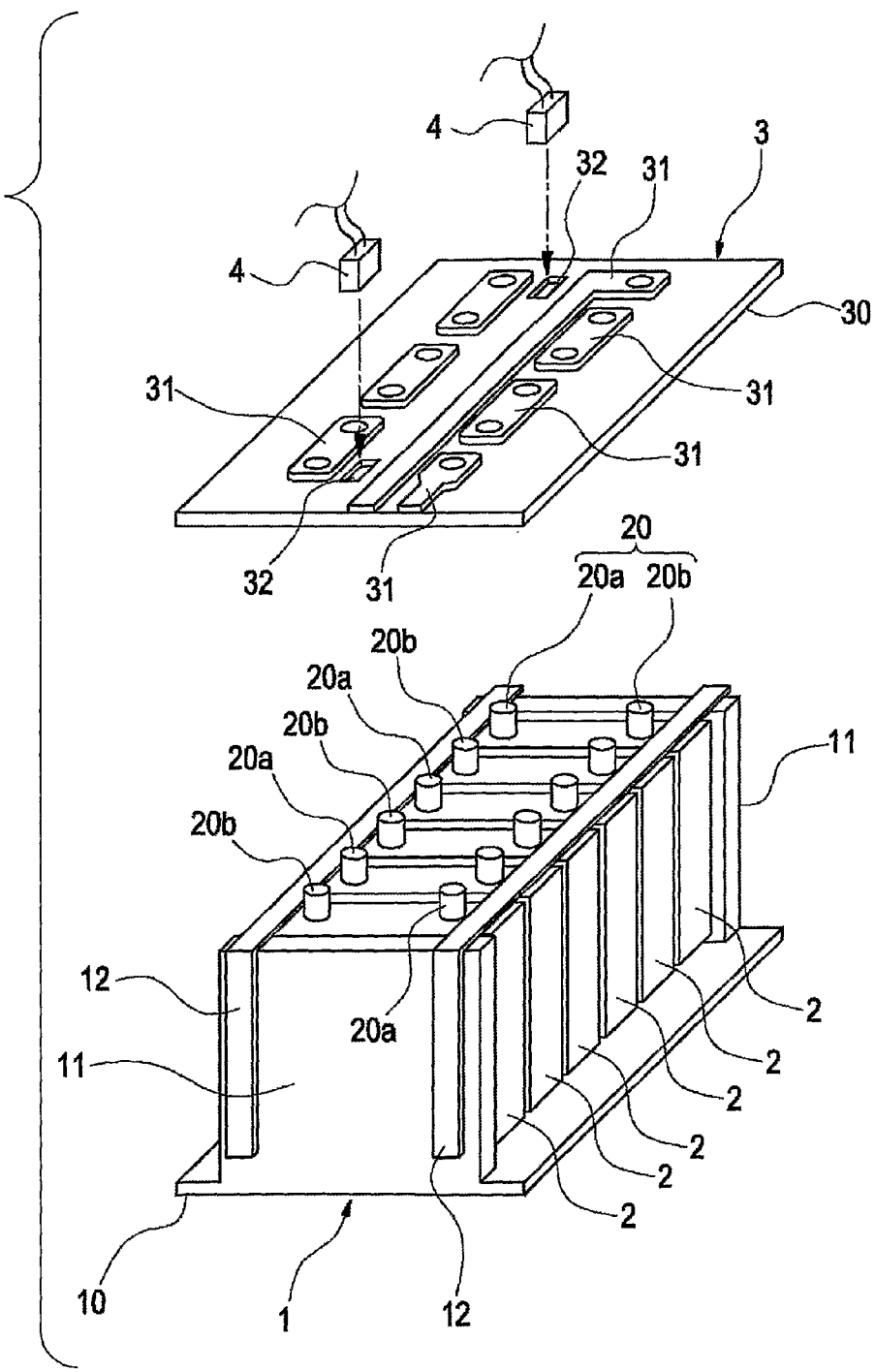
FIG. 1 is a perspective view showing a schematic formation of a temperature sensor attaching structure of the present invention.

Now, a preferred embodiment of a temperature sensor attaching structure of the present invention will be described in detail below by referring to the drawings.

Figure 2:
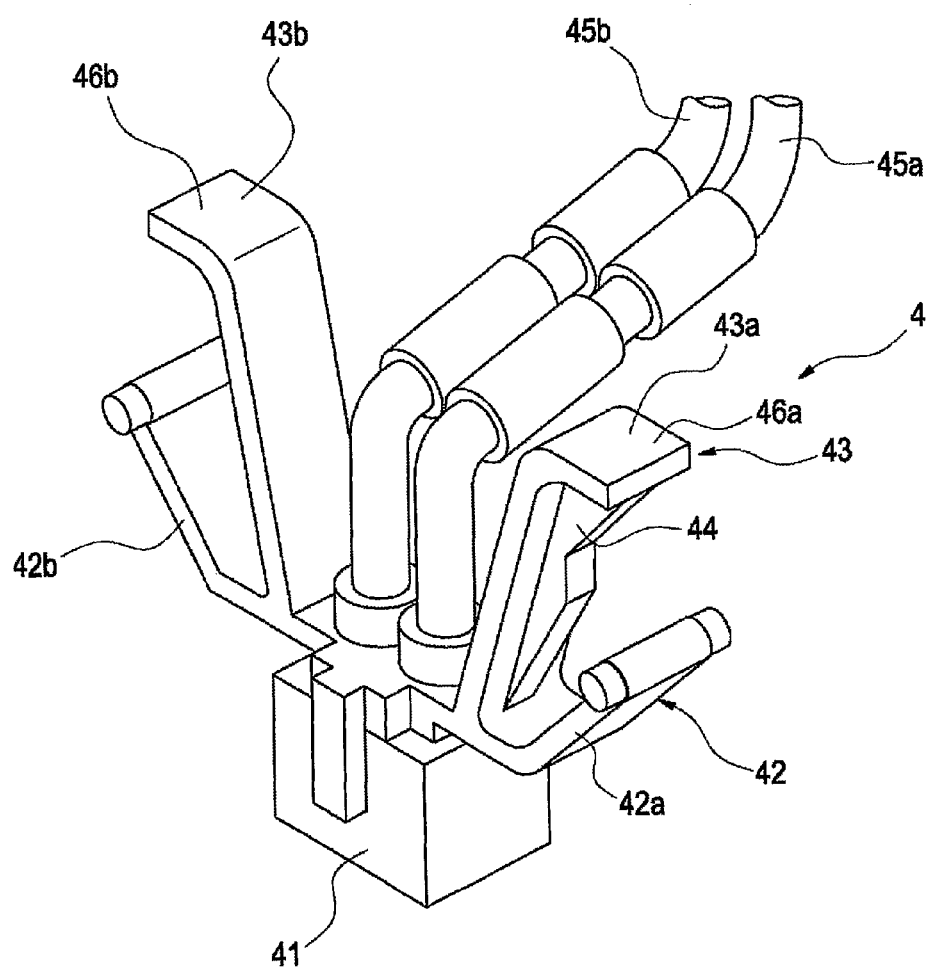
FIG. 2 is a perspective view of a temperature sensor.
Figure 3:
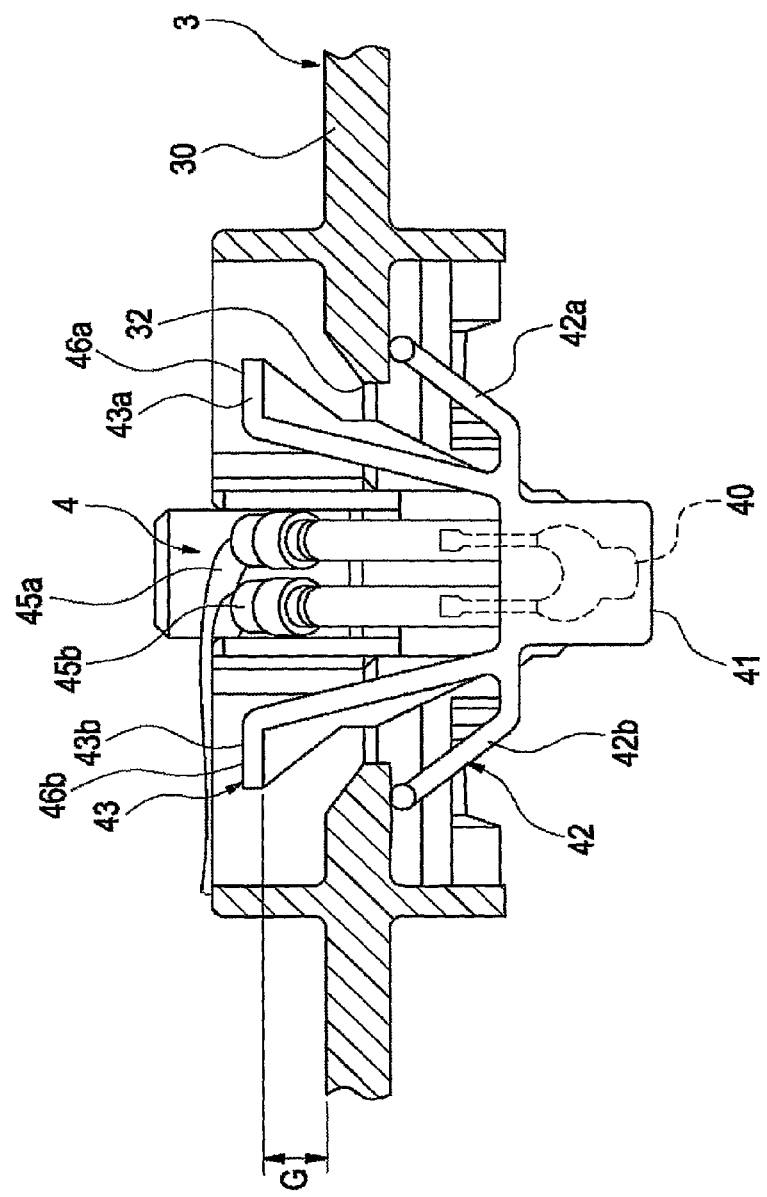
FIG. 3 is a sectional view of module parts.
Figure 4:
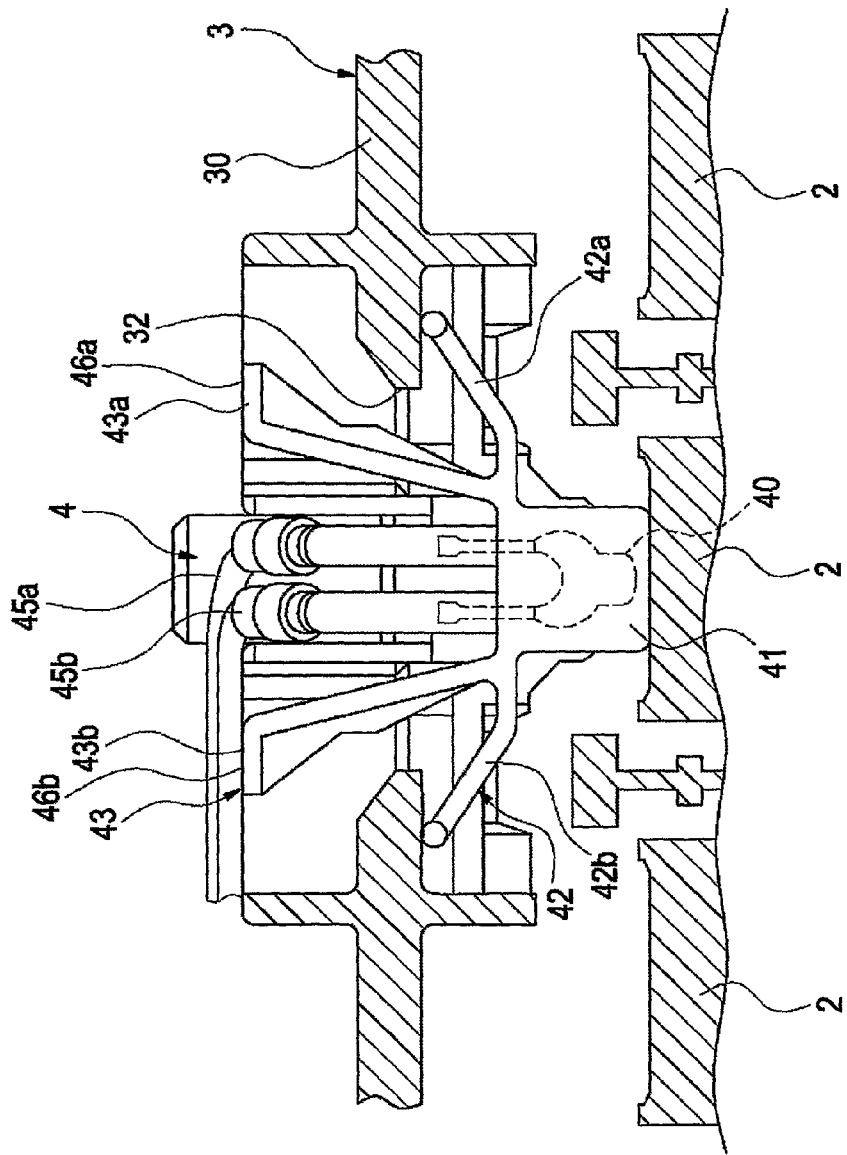
FIG. 4 is a sectional view of the module parts showing a state that the module unit are attached to a plurality of battery cells.
Figure 5:
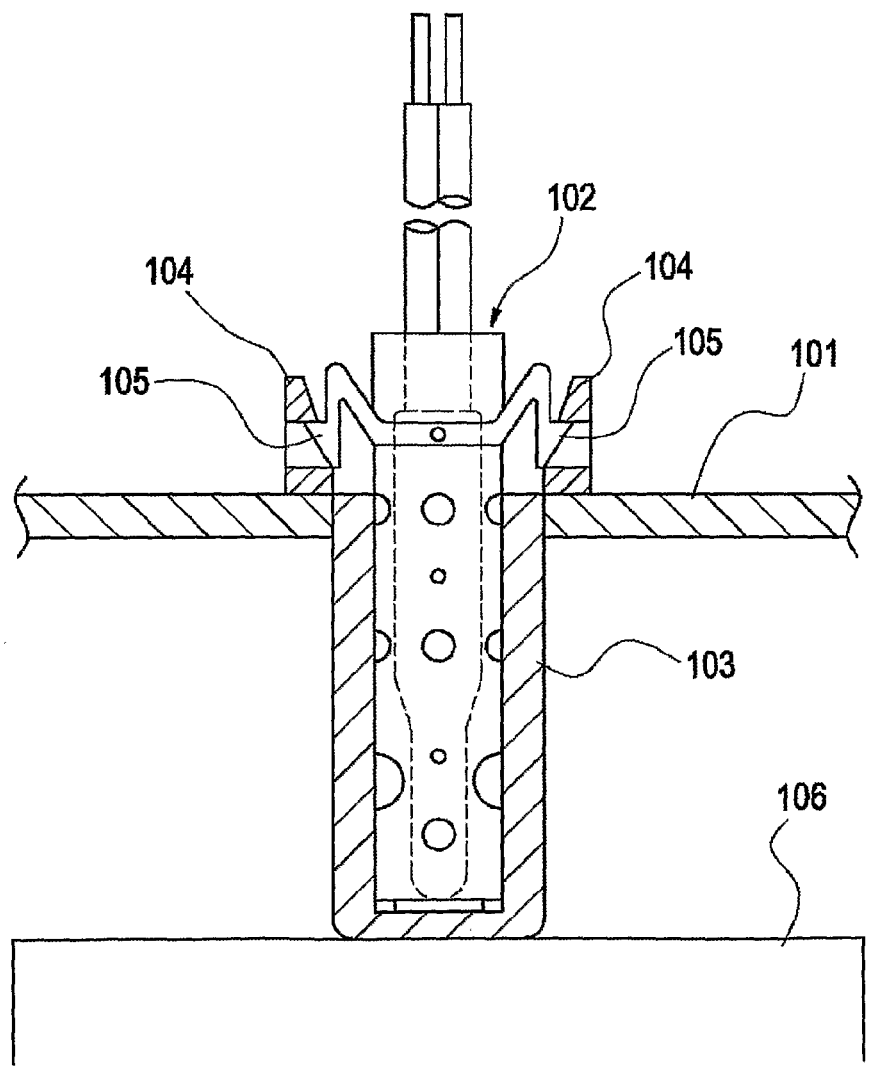
FIG. 5 is a sectional view of a usual temperature sensor attaching structure.

FIG. 1 is a perspective view showing a schematic formation of a temperature sensor attaching structure of the present invention. FIG. 2 is a perspective view of a temperature sensor. FIG. 3 is a sectional view of module unit. FIG. 4 is a sectional the module unit showing a state that the module unit is attached to a plurality of battery cells.

As shown in FIG. 1, the temperature sensor attaching structure of this embodiment includes module unit 3 attached over a plurality of arranged battery cells 2.

The plurality of battery cells 2 are held by a battery case 1. The battery case 1 includes a base 10 and a pair of side plates 11 standing on the base 10. The pair of side plates 11 are opposed to each other with a space interposed between them. The plurality of battery cells 2 are arranged in parallel with the side plates 11, at prescribed intervals and in one row between the pair of side plates 11 on the base 10.

Each battery cell has a pair of terminals 20 including a positive terminal 20a and a negative terminal 20b on an upper surface. The pairs of the terminals 20 respectively of the plurality of the arranged battery cells 2 are arranged in two rows, and the plurality of the battery cells 2 are arranged so that the positive terminals 20a and the negative terminals 20b are alternately arranged in each terminal row.

The battery case 1 has two frames 12 spread over the one pair of the side plates 11. The two frames 12 come into contact with the upper surfaces of the plurality of the battery cells 2 respectively and sandwich the battery cells 2 between the base 10 and these frames. The plurality of the battery cells 2 are sandwiched between the base 10 and the two frames 12 and held by the battery case 1.

The battery case 1 includes an upper cover (not shown in the drawing) for covering the plurality of the battery cells 2 and the module unit 3 attached over the battery cells 2.

The module unit 3 include a plate shaped module main body 30 attached to upper parts of the plurality of the arranged battery cells 2, bus bars 31 provided on the module main body 30 and a temperature sensor 4 engaged with the module main body 30.

The bus bars 31 connect the adjacent positive terminals to the negative terminals in each of the terminal rows and electrically connect the plurality of the battery cells 2 in series. Further, the bus bars 31 connect the positive terminal 20a and the negative terminal 20b located at both the ends of a series circuit formed with the plurality of the battery cells 2 to a prescribed circuit.

The temperature sensor 4 comes into contact with a prescribed battery cell 2 of the plurality of the battery cells 2 to measure the temperature of the battery cell 2. In an example shown in FIG. 1, two temperature sensors 4 are used. The two temperature sensors 4 respectively come into contact with the battery cells 2 arranged at both ends in the direction where the plurality of the battery cells 2 are arranged. At positions corresponding to the prescribed battery cells 2 in the module main body 30, through holes 32 are formed. The temperature sensors 4 are inserted into the through holes 32 and retained to edge parts of the through holes 32.

As shown in FIGS. 2 and 3, the temperature sensor 4 includes a main body part 41 having a temperature detecting element 40 such as a thermistor covered with a synthetic resin, a retaining portion 42 that can be retained to the edge part of the through hole 32 and an attaching portion 43 including flat surfaces (operation parts) 46a and 46b to be operated during an insertion of the temperature sensor and formed not so as to pass through the through hole 32.

The retaining portion 42 includes a pair of engaging pieces 42a and 42b extending rearward the main body part 41 from both side edge parts of the main body part 41. The pair of the engaging pieces 42a and 42b are inclined so as to be more separated from each other as the engaging pieces go nearer to their end parts and formed so that a space between the end parts is larger than a width of the through hole 32. Then, the pair of the engaging pieces 42a and 42b can be elastically deformed so as to narrow or widen the space between the end parts.

The attaching portion 43 includes a pair of attaching pieces 43a and 43b extending rearward the main body part 41. The pair of the attaching pieces 43a and 43b are formed between the pair of the engaging pieces 42a and 42b and extend more rearward than the pair of the engaging pieces 42a and 42b. The pair of the attaching pieces 43a and 43b are inclined so as to be more separated from each other as the attaching pieces go nearer to their end parts and formed so that a space between the end parts is larger than a width of the through hole 32. Then, ribs 44 are respectively formed in the pair of the attaching pieces 43a and 43b so that the pair of the attaching pieces 43a and 43b are hardly deformed to narrow the space between their end parts.

A pair of electric wires 45a and 45b connected to the temperature detecting element 40 of the main body part 41 pass through between the pair of the attaching pieces 43a and 43b from a central part of an upper surface of the main body part 41 and are pulled out rearward.

The temperature sensor 4 is inserted into the through hole 32 of the module main body 30 from an opposite side to the plurality of the battery cells by initially inserting the main body par 41 into the through hole 32. On both the end parts of the pair of the attaching pieces 43a and 43b, the flat surfaces 46a and 46b are formed that are operated during the insertion of the main body part 41. The flat surfaces 46a and 46b are pushed downward so that the temperature sensor 4 is pressed into the through hole 32. Here, the electric wires 45a and 45b are located between the attaching pieces 43a and 43b so that the electric wires 45a and 45b are protected not to be bent during the insertion of the temperature sensor 4.

When the temperature sensor 4 is inserted into the through hole 32, the pair of the engaging pieces 42a and 42b are elastically deformed so as to narrow the space between both the end parts due to a sliding contact with the edge part of the through hole 32 and pass through the through hole 32. Then, the pair of the engaging pieces 42a and 42b passing through the through hole 32 are restored from the elastic deformation and retained to the edge part of the through hole 32 from the battery cell 2 side. Since the pair of the attaching pieces 43a and 43b are restrained from being deformed to narrow the space between the edge parts, the attaching pieces 43a and 43b do not pass through the through hole 32 and are retained to the edge part of the through hole 32 from an opposite side to the battery cells 2.

The temperature sensor 4 inserted into the through hole 32 holds the edge part of the through hole 32 between the pair of the engaging pieces 42a and 42b or the pair of the attaching pieces 43a and 43b and is retained to the edge part of the through hole 32. As shown in FIG. 3, a little gap G may be formed between the pair of the engaging pieces 42a and 42b or the pair of the attaching pieces 43a and 43b and the edge part of the through hole 32.

As shown in FIG. 4, when the module unit 3 is attached over the plurality of the battery cells 2, the temperature sensor 4 allows a measuring surface of a protruding end of the main body part 41 to come into contact with the prescribed battery cell 2. Then, the temperature sensor 4 is pressed toward the module main body 30 due to this contact to allow the one pair of the engaging pieces 42a and 42b passing through the through hole 32 to be retained to the edge part of the through hole 32 from the battery cell 2 side. The edge part of the through hole 32 and the one pair of the engaging pieces 42a and 42b of the temperature sensor 4 as the retaining portion of the module main body 30 and the temperature sensor 4 is accommodated between the prescribed battery cell 2 and the module main body 30. Then, the main body part 41 of the temperature sensor 4 is sandwiched and fixed between the module main body 30 with which the one pair of the engaging pieces 42a and 42b are engaged and the battery cell 2. Thus, the main body part 41 of the temperature sensor 4 is held under a state that the main body part 41 comes into contact with the prescribed battery cell 2.

Further, in the temperature sensor attaching structure of this embodiment, the one pair of the engaging pieces 42a and 42b can be elastically deformed so as to narrow or widen the space between their end parts. Thus, when the temperature sensor 4 is pressed toward the module main body 30, the engaging pieces are elastically deformed so as to widen the space between both the end parts. Then, the elastic restoring force of the one pair of the engaging pieces 42a and 42b operates to press the main body part 41 to the battery cell 2. Thus, the main body part 41 is maintained in a state that the main body part 41 comes into contact with the prescribed battery cell 2.

As described above, according to the temperature attaching structure of this embodiment, when the flat surfaces 46a and 46b of the attaching portion 43 provided in the temperature sensor 4 are held and pushed downward to press the temperature sensor 4 into the through hole 32 formed on the module main body 30 of the module unit 3, the temperature sensor 4 is retained to the through hole 32. Then, under this state, the module unit 3 is attached over the plurality of the battery cells 2, so that the temperature sensor 4 is allowed to come into contact with the prescribed battery cell 2. Thus, even when a plurality of temperature sensors 4 are attached to the module main body, only a pushing-in operation may be carried out. Accordingly, an attaching work can be more simplified than a case that the temperature sensors are individually attached by using thermally connecting members or a solder and the efficiency of an attaching work can be improved. Further, a fastener usually provided in an accommodating part of a battery case is not required so that a cost can be reduced.

Then, the retaining portion of the module main body 30 and the temperature sensor 4 is accommodated between the battery cell 2 and the module main body 30. Thus, an external force can be prevented from acting on the retaining portion and the temperature sensor 4 can be prevented from being unexpectedly detached from the module main body.

Then, the temperature sensor 4 is sandwiched between the module main body 30 and the battery cell 2. Thus, the temperature sensor 4 can be assuredly and directly allowed to come into contact with the battery cell 2 and the deterioration of a measuring accuracy of the temperature sensor 4 can be avoided.

Further, an error at the time of attaching the module unit 3 to the battery cells is absorbed by an elastic deformation of the retaining portion 42. Then, the elastic restoring force of the retaining portion 42 acts on the temperature sensor 4 so as to press the temperature sensor 4 to the battery cell 2. Thus, the temperature sensor 4 can be more assuredly allowed to come into contact with the battery cell 2.

The present invention is not limited to the above-described embodiment and modifications or improvements can be suitably made. Further, as long as the present invention can be achieved, any of forms, dimensions, values, configurations, numbers, arranged positions or the like of components respectively in the above-described embodiment may be arbitrarily employed without a limitation.

For instance, in the above-described embodiment, the operation part is explained as the flat surface, however, the operation reviving part is not limited to this configuration and form, and as long as the above-described object can be achieved, various configurations and forms can be employed.

Industrial Applicability

The present invention provides a module unit of a temperature sensor that can easily and assuredly attach a temperature sensor for measuring the temperature of a battery cell and can reduce a cost in addition thereto.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2008-014898 filed on Jan. 25, 2008, the contents of which are incorporated herein for reference.

The invention claimed is:

1. A module unit, comprising:
a main body attached to a plurality of battery cells having a first side facing the plurality of battery cells and second side opposite from first side;
a bus bar provided on the main body to electrically connect the battery cells; and
a temperature sensor engaged with the main body to measure a temperature of at least one of the battery cells,
wherein the main body has a removed cut-out portion forming a through hole from the first side of the main body to the second side of the main body;
wherein the temperature sensor includes:
a retaining portion diagonally extending away from the temperature sensor and which is retained to an edge part of the first side of the main body at the through hole after the retaining portion passes through the through hole from the second side of the main body; and
an attaching portion which has an operation part at an end part thereof and is formed so as not to pass through the through hole and to be retained on the second side of the main body;
wherein when the operation part is pushed downward, the retaining portion is elastically deformed due to a sliding contact with the edge part of the first side of the main body so that the temperature sensor passes through the through hole; and
wherein when the main body is attached to the battery cells, the temperature sensor comes into contact with the at least one battery cell,
wherein the retaining portion is inside the main body.

2. The module unit according to claim 1, wherein when the main body is attached to the battery cells, the temperature sensor is pressed toward the main body by the at least one battery cell, so that the retaining portion arranged at the first side of the main body is retained to the edge part of the through hole on the first side of the main body.

3. The module unit according to claim 1, wherein the retaining portion is elastically deformed.

4. The module unit according to claim 3, wherein the retaining portion is elastically deformed in a direction in which the main body is attached to the battery cells.

5. The module unit according to claim 1, wherein the attaching portion extends diagonally away from the temperature sensor so as to not pass through the through hole.

* * * * *